United States Patent [19]
Ugolini

[11] Patent Number: 5,906,105
[45] Date of Patent: *May 25, 1999

[54] MACHINE FOR PRODUCING FROZEN BEVERAGES

[75] Inventor: Giancarlo Ugolini, Milan, Italy

[73] Assignee: Ugonli S.p.A., Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,946

[22] Filed: Mar. 21, 1997

[30] Foreign Application Priority Data

Apr. 3, 1996 [IT] Italy .................................. MI96A0654

[51] Int. Cl.⁶ ...................................................... A23G 9/12
[52] U.S. Cl. ............................................. 62/136; 366/274
[58] Field of Search .............................. 366/274; 62/136, 62/342

[56] References Cited

U.S. PATENT DOCUMENTS

| | | | |
|---|---|---|---|
| 2,859,020 | 11/1958 | Eddy et al. | 366/274 |
| 3,572,651 | 3/1971 | Harker | 366/274 |
| 3,822,565 | 7/1974 | Arzberger . | |
| 3,888,466 | 6/1975 | Sedam | 366/274 |
| 4,364,666 | 12/1982 | Keyes . | |
| 4,696,417 | 9/1987 | Ugolini . | |
| 4,736,593 | 4/1988 | Williams | 62/136 |
| 4,758,097 | 7/1988 | Iles, Sr. . | |
| 4,836,826 | 6/1989 | Carter | 366/274 |
| 4,913,555 | 4/1990 | Maeda et al. | 366/274 |

FOREIGN PATENT DOCUMENTS

| | | |
|---|---|---|
| 2542578 | 9/1984 | France . |
| 2167845 | 6/1986 | United Kingdom . |

*Primary Examiner*—William E. Tapolcai
*Attorney, Agent, or Firm*—Shlesinger,Fitzsimmons & Shlesinger

[57] ABSTRACT

A machine for preparing and delivering frozen beverages, such as water-ices, comprises a tank (12) for holding and refrigerating the beverage, in which there is an evaporator (16) of a refrigerating circuit and a mixing propeller (18) the rotation axis (19) of which is magnetically coupled, through a tank wall (28), with the rotation axis of an electric reduction motor (21). The magnetic coupling is formed of a first magnetic set (22) external to the tank and driven in rotation by the rotation axis of the reduction motor, and a second magnetic set (23) internal to the tank and connected to the propeller rotation axis. The first and second sets face each other on opposite faces of the tank wall to be magnetically coupled through said wall, the first set (22) thereby driving in rotation the second set (23).

4 Claims, 3 Drawing Sheets

MACHINE FOR PRODUCING FROZEN BEVERAGES

BACKGROUND OF THE INVENTION

The present invention relates to a machine for producing frozen beverages, such as water-ices.

In the known art machines have been known which comprise a transparent tank containing an evaporator of a refrigerating circuit and a mixing propeller to keep a beverage moving in the tank and cool it. A delivery tap at one end of the tank enables the frozen beverage thus obtained to be poured out. Usually, the tank is provided with a side opening for sealingly receiving the evaporator and mixer, which are horizontally supported in cantilevered fashion by a vertical shoulder fastened to the machine base. As a result of this, the tank can be easily removed for careful cleaning.

If the beverage is cooled too much, the beverage thickness becomes consequently excessive and there is an increase in the propeller resistance to rotation until the propeller completely stops. Under this condition the electric rotation motor is likely to undergo a permanent damage in a short period of time. In order to avoid this damage, in known machines thermal protection have been inserted which intervene when the motor, due to its stopping, gets overheated; it has also been suggested that the motor should be mounted in such a manner that in case of an excessive resistance to rotation the motor itself will, by reaction, turn about the shaft axis, against the action of a counterspring, thereby activating a microswitch that will disable the refrigerating circuit.

Should the beverage thickness increase too much and in particular should the beverage get fully frozen so as to form a single ice block consisting of several liters in volume, a relatively long time will be required before the beverage thickness may come back to an acceptable value. In addition, in spite of the contemplated solution in which it is waited for motor overheating before proceeding to electrically disconnecting it, an anomalous motor stress is involved which in the long run will bring about failures.

It is also to be pointed out that obviously, except for some fortuitous cases, the motor cooling time does not coincide with the mass thawing time. As a result, the motor could be submitted to repeated overheatings. Passage of the rotating propeller shaft through the tank wall often gives rise to some problems, due both to unavoidable liquid losses and escapes therethrough and to difficulties encountered in cleaning operations.

It is a general object of the present invention to obviate the above mentioned drawbacks by providing a machine for producing frozen beverages which enables the mixture thickness to be brought back to an optimal thickness more quickly in case of an excessive cooling, avoids occurrence of motor overheatings, and prevents liquid losses and problems in cleaning the tank.

SUMMARY OF THE INVENTION

In view of the above object, in accordance with the invention a machine for preparing and delivering frozen beverages such as water-ices has been devised which comprises a beverage-holding and cooling tank in which there is an evaporator of a refrigerating circuit and a mixing propeller having a rotation axis coupled with the rotation axis of an electric reduction motor, through a tank wall, characterized in that coupling between the rotation axis of the reduction motor and the rotation axis of the propeller is of a magnetic type.

Magnetic stirrers have been known in the art. Such stirrers however are intended for transmitting low torques at high speeds and are exclusively employed for stirring liquids of a thickness as low as that of water.

Furthermore, in case of accidental stopping of the propeller, the stirrer must be manually triggered again since the driving magnets do not succeed in spontaneously hooking the driven magnets again. In addition, known stirrers are exclusively utilized for the purpose of avoiding the propeller shafts passing through the container walls and enabling employment of different types of containers not made for the specific purpose. No application exists which is capable of improving operation of machines for producing frozen beverages and carrying out recovery of an optimal thickness in frozen liquids.

BRIEF DESCRIPTION OF THE DRAWINGS

For better explaining the innovatory principles of the present invention and the advantages it offers over the known art, a possible embodiment applying said principles is given hereinafter by way of non-limiting example with the aid of the accompanying drawings. In the drawings.

DETAILED DESCRIPTION OF THE INVENTION

Figure 1:
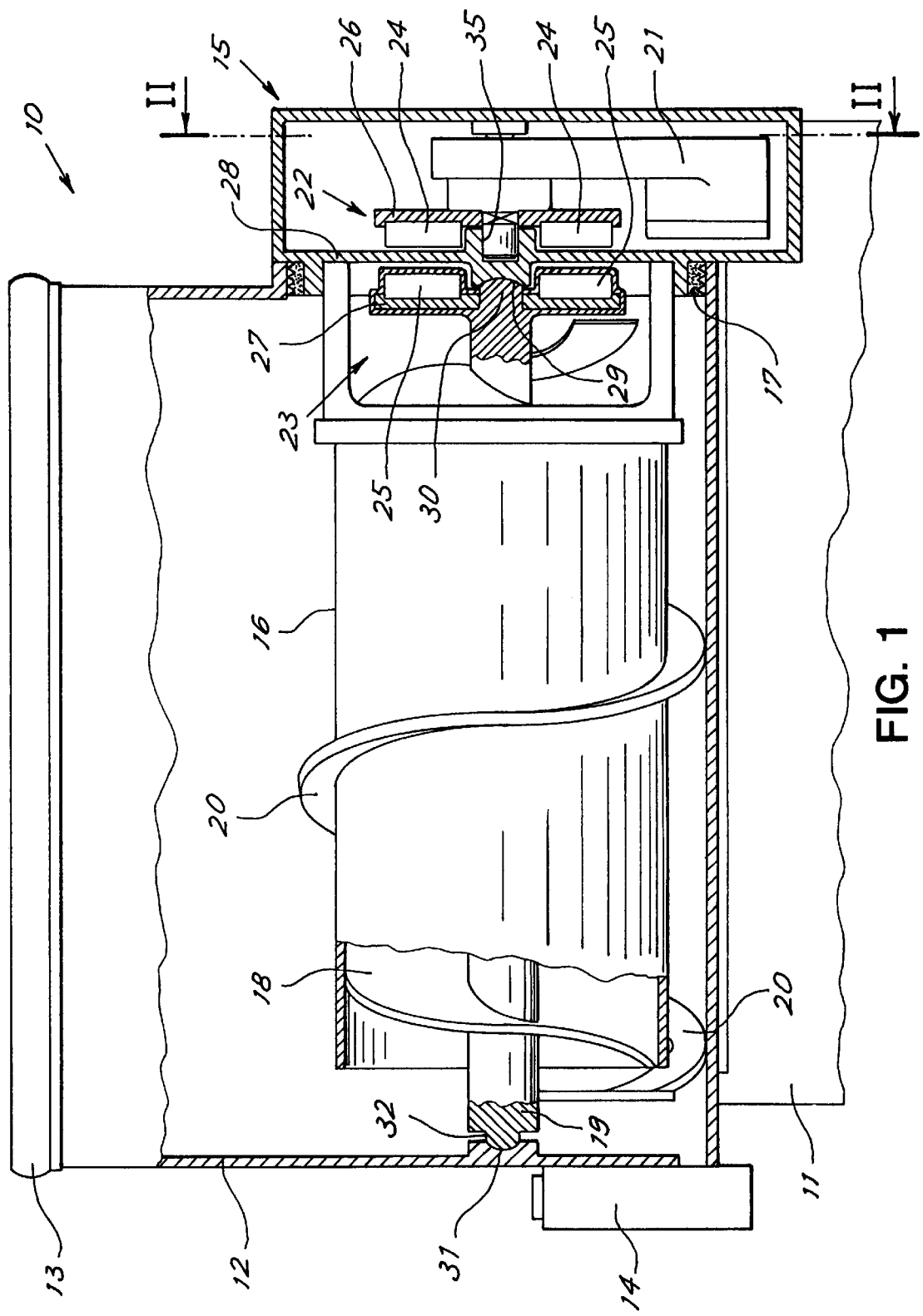
FIG. 1 shows a diagrammatic elevational side view, partly in section, of a machine in accordance with the invention.

With reference to the drawings, a machine made in accordance with the invention is diagrammatically shown in FIG. 1 and identified by reference numeral 10. The machine 10 comprises a base 11 (holding the refrigerating circuit, not shown), on top of which a container or tank 12 provided with an upper cover 13 and a delivery tap 14 is placed. The base 11 terminates with a shoulder 15 from which an evaporator 16 of the refrigerating circuit horizontally extends. The tank 12 is provided with a corresponding side opening intended for sealingly coupling with an annular embossment of shoulder 15 with the aid of a seal 17. In this way, the tank can be easily slipped off the evaporator to be removed from the base, for carrying out washing and cleaning operations for example.

The evaporator is in the form of a cylinder and a propeller 18 is disposed inside it. The rotation axis 19 of the propeller is coaxial with the cylinder.

Advantageously, a second propeller 20 may be provided which is integral with the inner propeller and runs along the outer wall of the cylinder.

The rotation shaftor axis 19 of the mixing propeller 18 is coupled, through the container wall 28 embodied by shoulder 15, with the rotation shaftor axis of an electric reduction motor 21 disposed externally of the container (within shoulder 15, for example), to make the propeller rotate at a relatively high torque and low speed.

Until now a machine for producing and delivering frozen beverages substantially belonging to the known art has been described. For the above reason the different circuits required for operation of same, such as the refrigerating circuit for example, will not be further described or shown, a person of ordinary skill in the art being able to easily imagine them.

In accordance with the invention principles, coupling between the axis of the mixing propeller and the rotation axis of the reduction motor consists of a first magnetic set 22, external to the container and driven in rotation by the rotation axis of the reduction motor 21, and a second magnetic set 23 internal to the container and connected to the rotation axis of the propeller. The first and second magnetic sets face each other on opposite faces of the container wall, so that they get magnetically coupled through the wall. In this way, the first set drives in rotation the second set. The attraction force between the first and second sets must be such selected as to enable transmission of the desired rotation torque of the propeller. As will be apparent in the following, the transmissible torque must be capable of enabling rotation of the propeller only until the product thickness does not exceed the maximum thickness intended for it by more than a predetermined value. The transmissible torque must not be higher than the admitted safety torque for the motor used. In other words, in case of an excessive resistance to rotation by the propeller, or even in case of stopping of rotation, the driving magnetic set 22 must be able to go on rotating being moved by the motor.

Figure 2:
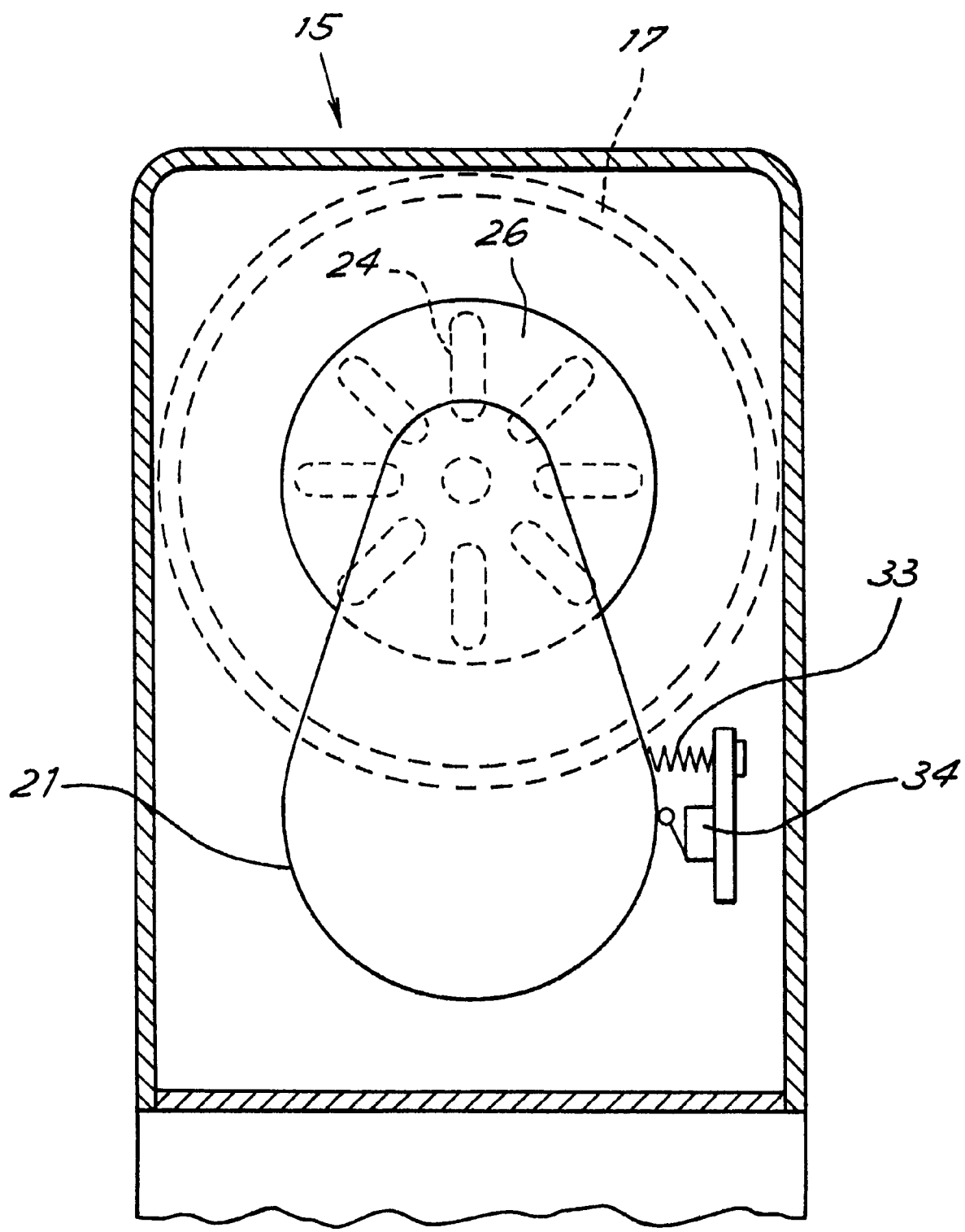
FIG. 2 is a diagrammatic rear view taken along line II—II in FIG. 1.

As clearly shown in FIG. 2, advantageously the first and second magnetic sets can be each formed of a plurality of radially disposed magnets or magnetic poles 24, 25, spaced apart from each other about the rotation axis of the respective set. The angular pitch may be included between 30° and 90°, being for example of 45° as shown in FIG. 2. The plurality of magnets 24 or 25 of each set is supported by a respective disc 26 or 27 made of ferromagnetic material, the disc having an axis coinciding with the rotation axis of the respective set so that the discs face each other with interposition of the container wall 28.

As viewed from FIG. 1, the magnetic set 23 is advantageously incorporated into plastic material forming an extension of the propeller shaft 19, for example.

In order to enable the propeller 18 to be axially supported in a rotatable manner, wall 28 may be provided with a seating 29 for one end of shaft 19, whereas the opposite tank wall can offer a seating 31 for the other end 32 of shaft 19. In this manner, by slipping the container 12 off the shoulder 15, the propeller is released for removal and easy cleaning. Wall 28 may be also externally provided with a seating 35 for the rotation shaft of the reduction motor.

As clearly shown in FIG. 2, the reduction motor 21 is hung on its rotation axis, at the front and at the back, and a force counteracting rotation about its axis is applied thereto by means of a spring 33. A sensor, a microswitch 34 for example, is arranged to detect the rotation extent of the reduction motor and disable the refrigerating circuit on detection of a rotation greater than a predetermined value. The spring is such set that the microswitch is operated when the propeller encounters a resistance greater than a predetermined value, corresponding to the optimal admissible thickness for the beverage in the tank. In this way, when the product thickness increases beyond a predetermined value, the torque produced by the motor causes the reduction motor to rotate against the action of the spring and the refrigerating circuit to be disabled until the product thickness in the tank lowers to an acceptable value.

With a machine in accordance with the innovatory principles of the invention, unlike what happened in the known art, the motor can go on rotating without being subjected to overstresses even when the propeller fully stops due to an excessive hardening of the mass, as a result for example of a wrong mixture or faults in the refrigerating circuit. The automatic uncoupling of the propeller from the motor on increasing of the resistance exerted on the propeller, in addition to avoiding failure of the motor, offers an additional safety for the machine should a human hand be accidentally introduced into the tank while the machine is being operated, since the propeller stops in the presence of the hand before producing any damage.

In accordance with the invention, in case of thickness increase and, as a result, uncoupling of the driving magnetic set from the driven magnetic set, the rotating magnetic field will tend to hook the two sets again at each angular pitch between the magnetic poles. Therefore, there is a pulsating torque applied to the blocked propeller. This pulsating torque will make the propeller act as a striker or hammer on the ice block, thereby accelerating releasing of same from the frozen beverage. This helps both in directly reducing the mixture thickness and in making thawing out of the ice block quicker, when the refrigerating unit is stopped.

At this point it is apparent that the intended purposes have been reached, by providing a machine for producing frozen beverages in which the motor is submitted to lower efforts, an active treatment of the frozen beverage takes place under situations of excessive cooling for bringing the beverage back to its optimal condition and possible liquid leakages from the tank are eliminated. In addition there are no longer points of difficult cleaning such as shaft passages with seals.

Obviously, the above description of an embodiment applying the innovatory principles of the present invention is given for illustrative purposes only and cannot be considered as a limitation of the scope of the invention as herein claimed.

For example, the tank conformation and the proportion of the different parts of the machine may vary depending on requirements. In addition, the machine may comprise elements such as level sensors, liquid and syrup topping up devices, etc. as well-known in the art.

Figure 3:
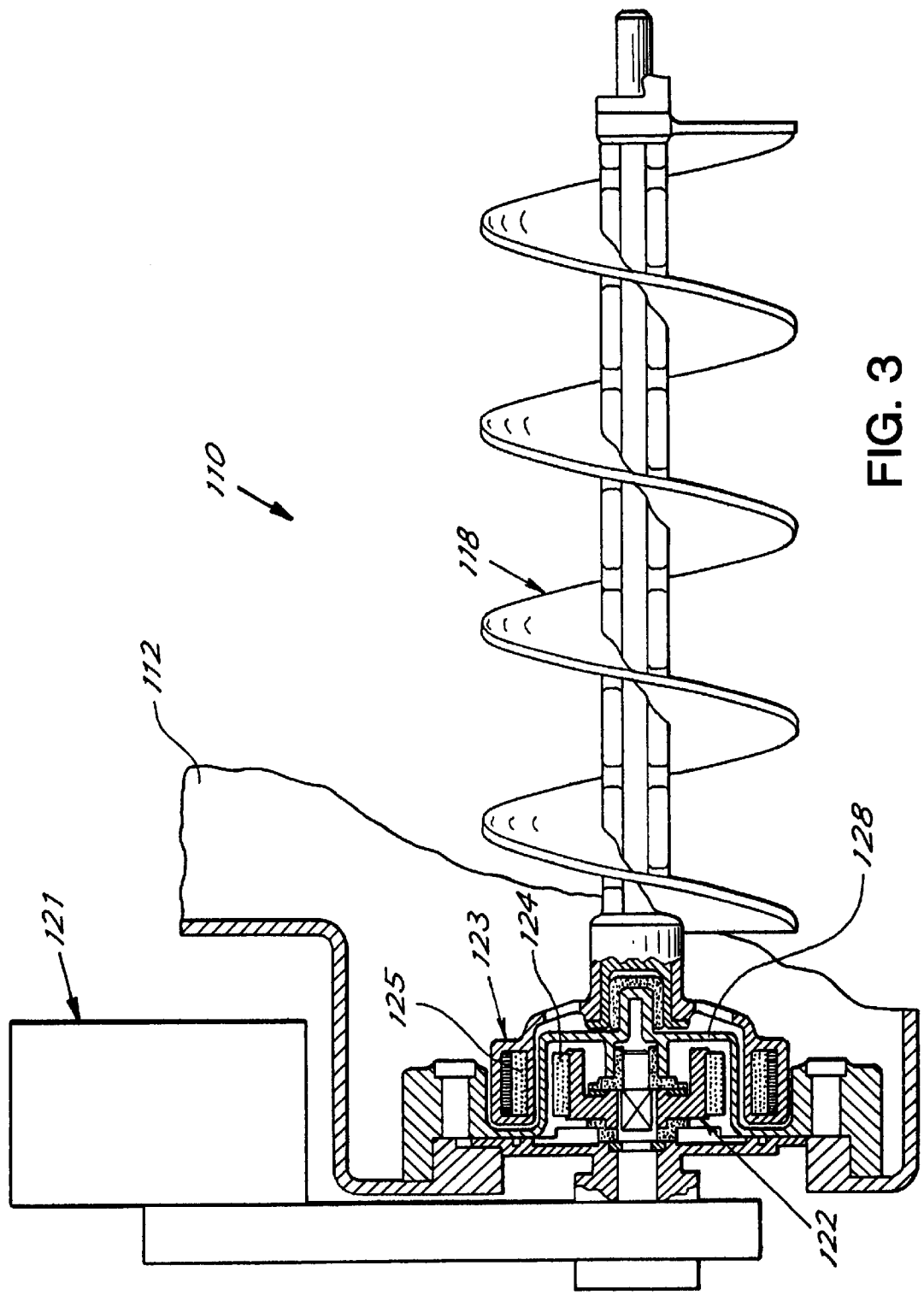
FIG. 3 is a sectional part view of an alternative version of the machine in FIG. 1.

Shown in FIG. 3 is an alternative version, generally identified by 110, of a machine in accordance with the invention. Similar elements have been allocated the same reference numerals as in FIG. 1 with the addition of 100. The cooler and the other machine elements are not shown or described as they can be similar to those in FIG. 1. In this version 110, a reduction motor 121 operates a propeller 118 through a first magnetic set 122 external to the tank 112 and connected to the reduction motor, and a second magnetic set 123, internal to the tank and connected to the propeller 118.

The two magnetic sets have magnets 124, 125 mutually facing at the two sides of the tank wall 128. According to this alternative solution, magnets face each other in a radial direction to the rotation axis, due to an appropriate conformation of wall 128 which is cylindrically shaped instead of being flat. This embodiment has been found particularly advantageous in case of magnets of strong mutual attraction.

Actually, by the arrangement in FIG. 3 the attractive force between magnets is radial to the rotation direction (that is the separation direction of the propeller 118 from the machine). Therefore, for the propeller removal a force is required which is smaller than that needed in the embodiment in FIG. 1 in which magnets face each other in a direction parallel to the rotation axis. As a result, the propeller diassembling for cleaning is made easier.

In case of propellers rotating about a closed cooling cylinder devoid of inner propellers, the magnetic connection means (of the type as shown in FIGS. 1 or 3) may be located at the other end of the cylinder in respect of the arrangement shown in FIG. 1, the cylinder end wall practically embodying the tank wall.

What is claimed is:

1. A machine for preparing and delivering frozen beverages, such as water-ices, comprising a tank for holding and cooling the beverage, and in which tank there is mounted an evaporator of a refrigerating circuit and a rotatable beverage mixing propeller the rotation shaft of which has one end thereof coupled coaxially through a tank wall, with a registering end of the rotation shaft of an electric reduction motor, characterized in that the registering ends of said shafts are rotatably supported in opposite sides, respectively, of said wall, and the coupling between the rotation shaft of the reduction motor and the rotation shaft of the propeller is of a magnetic type comprising a first plurality of magnets secured to the motor shaft, and a second plurality of magnets secured to the propeller shaft, said first and second pluralities of magnets facing each other in a direction transverse to their respective rotation axes, and being operative to transmit to said propeller a predetermined rotation torque, and to permit rotation of said propeller to cease while permitting the shaft of said motor to continue to rotate when said predetermined rotation torque has been exceeded.

2. A machine as claimed in claim 1, characterized in that the magnets or magnetic poles are radially spaced apart from each other by an angular pitch included between 30° and 90°.

3. A machine as claimed in claim 1, characterized in that said wall has a supporting seating on its inner face for receiving an end of the rotation shaft of the propeller coaxially carrying the second set.

4. A machine as claimed in claim 1, characterized in that the magnetic sets face each other in a direction transverse to their own rotation axis.

* * * * *